June 18, 1968   R. D. MILLER ET AL   3,389,321
FREQUENCY SENSING DETECTOR FOR STOPPING A MOTOR UPON SLOWDOWN
Filed April 27, 1965   2 Sheets-Sheet 1
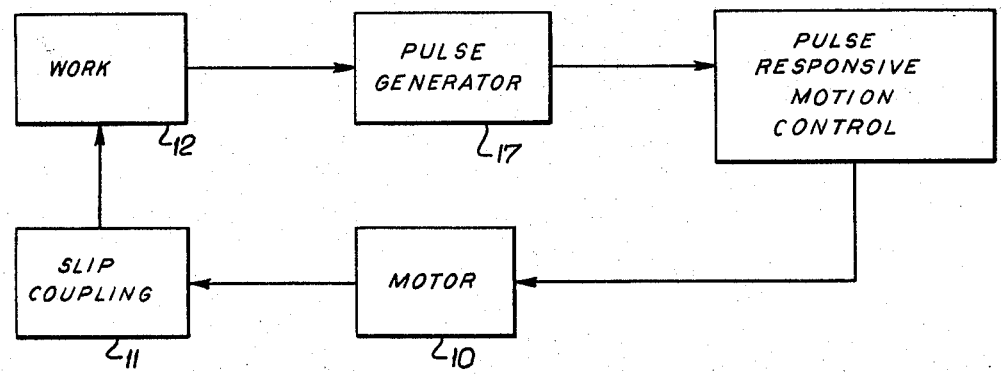
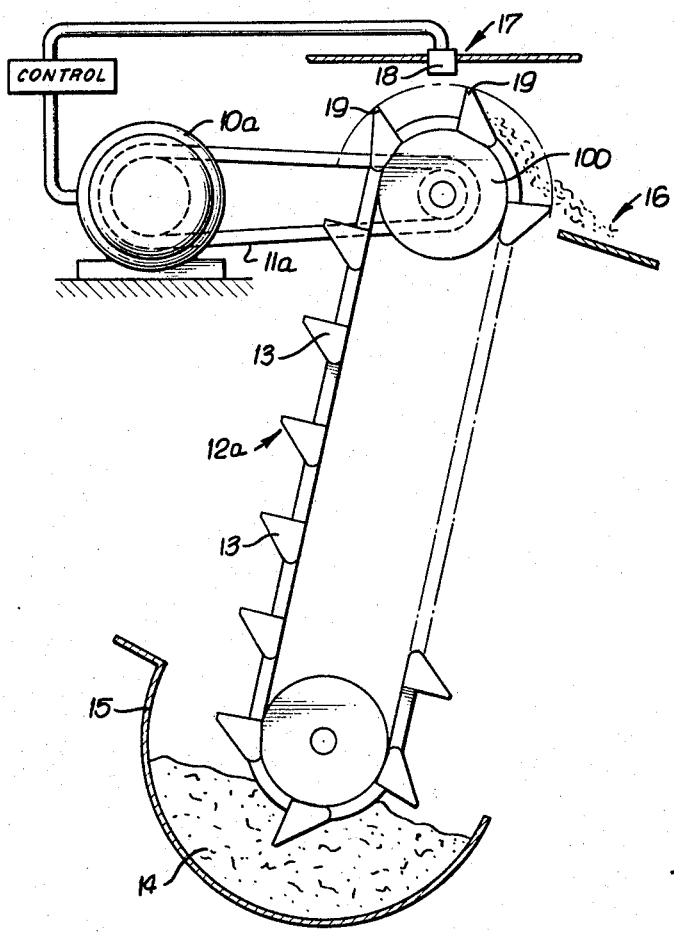
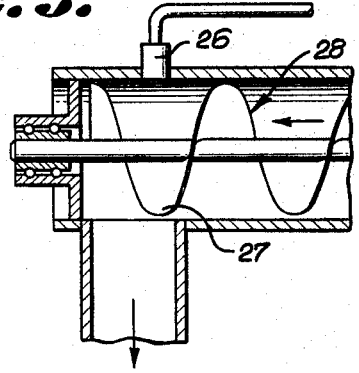
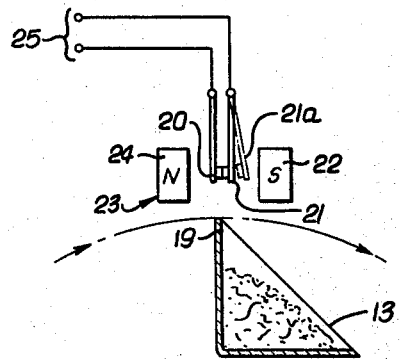
INVENTORS.
ROBERT D. MILLER
RONALD E. EVANS
By White & Haefliger
ATTORNEYS.

June 18, 1968 R. D. MILLER ET AL 3,389,321
FREQUENCY SENSING DETECTOR FOR STOPPING A MOTOR UPON SLOWDOWN
Filed April 27, 1965 2 Sheets-Sheet 2

INVENTORS.
ROBERT D. MILLER
RONALD E. EVANS
By White & Haefliger
ATTORNEYS.

United States Patent Office 3,389,321
Patented June 18, 1968

3,389,321
FREQUENCY SENSING DETECTOR FOR STOPPING A MOTOR UPON SLOWDOWN
Robert D. Miller, Redlands, and Ronald E. Evans, Riverside, Calif., assignors to California Portland Cement Co., Los Angeles, Calif., a corporation of California
Filed Apr. 27, 1965, Ser. No. 451,183
11 Claims. (Cl. 318—463)

ABSTRACT OF THE DISCLOSURE

The disclosure concerns an electric motor and loadable apparatus coupled to be driven by the motor so that the effective rate of advancement of the apparatus decreases under an abnormal condition, means to generate electrical pulses at a frequency proportional to the advancement rate of the apparatus, and circuit means connected to receive said pulses and to effect de-energization of the motor in response to a predetermined decrease in the frequency of pulse reception, said circuit including SCR control network and relay elements.

---

This invention relates generally to motion controls, and more particularly concerns the control of drive motor de-energization in response to an abnormal condition imposed by apparatus driven by the motor.

While many different motion controls have been constructed in the past, none of them of which we are aware possess the unusually effective combinations and sub-combinations of structure and advantages characterizing the present control and particularly as they relate to motor de-energization in response to speed change. Among these, which may be considered as major objects of the invention, are the provision of means to generate electrical pulses at a frequency proportional to the advancement rate of motor driven apparatus, together with control circuit means connected to receive the pulses and to effect de-energization of the motor in response to a predetermined decrease in the frequency of pulse reception; the provision in the control circuit of a relay to control de-energization of the motor, a switch connected in series with the relay coil and operable between conductive and non-conductive states at a frequency proportional to the frequency of pulse reception, and a delay network connected to delay motor de-energizing operation of the relay when the switch is in one of its states; and the provision of motor driven conveyor apparatus including an element subject to advancement in response to conveyor advancement, and wherein the pulse generating means includes a sensor located to sense the advancement of the element and characterized in that the pulse generating means produces a pulse in response to said sensing. One unusually advantageous result lies in the simplicity and effectiveness of the control, both in its construction and operation, to achieved de-energization of the motor as conveyor system movement decreases, and without any mechanical connection to the conveyor. Also, there is no need for a complex oscillator circuit.

Other objects and advantages of the invention include the provision of a simple and effective circuit means capable of functioning in the manner described above, and including a relay usable to control de-energization of the motor, an SCR switch connected in series with the relay coil, an SCR control network having a pulse receiving input and an output connected to operate the SCR between conductive and non-conductive states at a frequency proportional to the frequency of pulse reception by the network input, and a delay network connected to delay operation of the relay when the SCR is in one of its states. Typically, the control network includes a transistor having emitter, base and collector electrodes one of which is connected to receive input pulses from the conveyor speed responsive pulse generator, a transformer having primary and secondary coils, an AC to DC converter, the converter and the primary coil being connected in series and across the remaining two electrodes of the transistor, and the transformer secondary coil being connected to control the state of the SCR.

These and other objects and advantages of the invention, as well as the details of illustrative embodiments, will be more fully understood from the following detailed description of the drawings in which:

FIG. 1 is a functional block diagram showing the control system;

FIG. 2 is an elevation showing a control system incorporating a pulse generator responsive to the speed of a materials elevator, the latter and a drive motor having slip drive interconnection;

FIG. 3 is a section showing a pulse generator responsive to the rotary speed of a screw conveyor;

FIGS. 4–6 are enlarged fragmentary showings of three types of pulse generators;

Figure 5:
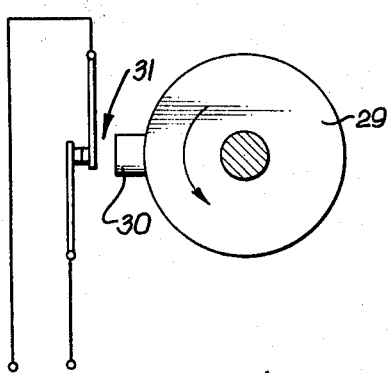

Referring first to FIG. 1, the system illustrated includes an electric motor 10 having slip coupling drive connection at 11 with movable work 12, such as variably loadable apparatus. The coupling is such that the rate of advancement of the apparatus 12 decreases under a sufficient overload condition, and as one example of this reference is made to FIG. 2 wherein the motor 10a has a belt connection at 11a with the traction wheel 100 of an endless conveyor 12a. The latter has buckets 13 for lifting material 14 from bin 15 to an upper level 16, and under sufficient overload the traction wheel 100 will slip, it then being desirable to automatically shut down or de-energize the motor. Another type of slip coupling would be the magnetic slip drive of an induction motor.

Referring back to FIG. 1, the invention also contemplates the provision of pulse generator means 17 to generate electrical pulses at a frequency proportional to the advancement rate of the work or loadable apparatus 12. in FIG. 2 the pulse generator 17 includes a sensor 18 located to sense the advancement of an element or elements 19 in response to conveyor advancement. Typically, one of the elements 19 is on each of the conveyor buckets 13, and may comprise that portion of the bucket that passes nearest the sensor 18. In FIG. 4, the sensor includes a fixed contact 20 and a movable contact 21 spring urged to the broken line position 21a, i.e. toward one pole 22 of a magnet 23. As the steel bucket element 19 passes near, the magnetic field of the poles 22 and 24 is deflected, allowing contact 21 to momentarily close against contact 20, generating a pulse at terminals 25.

Figure 6:
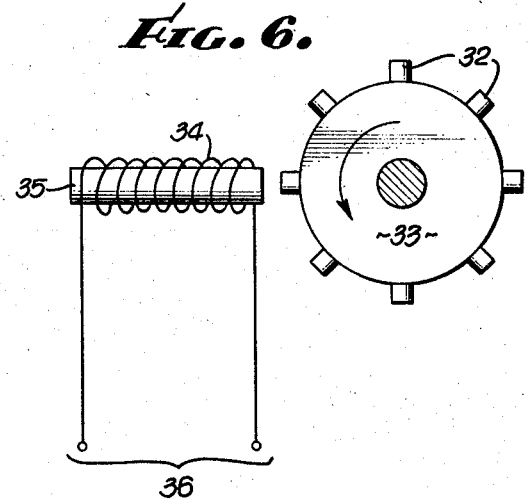

FIG. 3 shows a sensor 26 located to sense the rotary advancement of element 27 on screw conveyor 28. In FIG. 5 a rotary conveyor 29 has a magnetic element 30 which passes near the contacts of a sensor 31, controlling their opening and closing for pulse generation. In FIG. 6 ferrous metal elements 32 on a rotary part 33 driven by a conveyor travel past a pulse generator coil 34 and core 35, generating pulses at output terminals 36. Elements 32 alter the magnetic field produced in response to energization of the coil 34 and also in response to advancement of the elements 32.

The invention also contemplates the provision of what may be characterized as circuit means connected to receive the output pulses of the pulse generator and to effect de-energization of the motor, such as motor 10, in response to a predetermined decrease in the frequency of pulse generation. More specifically, the circuit means may include a relay to control de-energization of the motor, a switch connected in series with the relay coil and operable between conductive and non-conductive states at a frequency proportional to the frequency of generator output pulse reception, and a delay network connected to delay motor de-energizing operation of the relay when the switch is in one of the referred to states. One such relay is indicated at 40 in FIG. 7, with a switch in the form of a silicon controlled rectifier 41 connected in series with the relay coil. When the SCR is turned on, DC current flows in series through the relay coil, diode 42 and the SCR, causing the relay to close, the AC source being indicated at 46.

A typical delay network is indicated at 43, and includes a capacitor 44 connected across the relay coil and a variable resistor 45 connected in series with the capacitor. When power is turned on, DC current flows through capacitor 44, resistor 45, diode 42 and the SCR 41, charging the capacitor. Turn-off of the SCR is controlled by a pulse generator responsive network 47, which will be described in detail, such turn-off stopping DC current flow through the SCR. Capacitor 44 will then discharge through the variable resistor 45 and coil of relay 40, providing a delayed drop-out of relay 40. The drop-out time is adjusted through the use of variable resistor 45.

Turning now to control network 47, it has a pulse receiving input at 48 and an output at 49 connected to operate the SCR 41 between conductive and non-conductive states at a frequency proportional to the frequency of pulse reception by the input 48. Typically, the control network includes a transistor 50 having emitter, base and collector electrodes 51–53 one of which, i.e. the base electrode 52 in FIG. 7, is connected to receive the input pulses.

Figure 7:
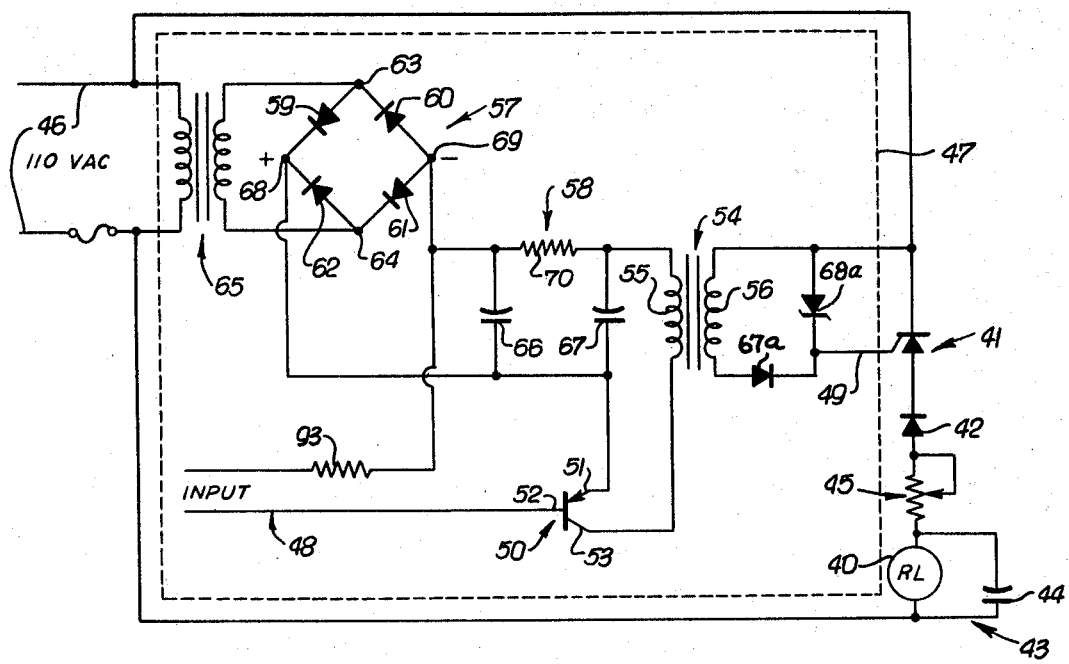
FIG. 7 is a circuit diagram illustrating a pulse responsive motor control incorporating the invention.

The control network of FIG. 7 also includes a transformer 54 having primary and secondary coils 55 and 56, and an AC to DC converter 57, the converter and primary coil being connected in series through a filter 58, and also across the remaining two electrodes of the transistor, i.e. emitter and collector 51 and 53. Converter 57 is made up of diodes 59–62 connected as a bridge, points 63 and 64 of which are connected with a voltage dropping input transformer 65. Capacitors 66 and 67 filter the ripple output of the converter taken from points 68 and 69, and resistor 70 acts to limit the current. The pulse generator is supplied with current via converter tap 69 and attenuating resistor 93.

When transistor 50 is turned on, low ripple DC current flows through primary 55 of transformer 54, whereby no current flows in transformer secondary 56; however, if transistor 50 is turned on and off in accordance with reception of an input pulse from the pulse generator, a pulsating voltage will be transmitted to the secondary 56. That voltage is rectified by a diode 67a and limited to a maximum value by Zener diode 68a; further, the pulse on the secondary 56 turns the SCR 41 on momentarily, causing the relay 40 to close and to drop out or open only after a prefetermined delay, as described above. Therefore, if the rate of pulse reception at the input 48 to network 47 is sufficient, the relay 40 will remain closed and the drive motor will remain energized; however, if the rate of pulse reception drops below a critical value, corresponding to predetermined slowing of the conveyor, the relay will drop out and the motor will become de-energized. In this regard, diode 42 serves to protect the SCR 41 against transient spikes. It will be noted that transistor 50 can be turned on over a wide resistance range at its input, say 0–10,000 ohms for example, resulting in extreme versatility; thus, the pulse generator contacts may become dirty, with high resistance increase, but the transistor will still turn on and off giving proper control. Other types of pulse generators include photo cells and limit switches operated by elements moving in series relative to the photo cell or limit switch.

Figure 8:
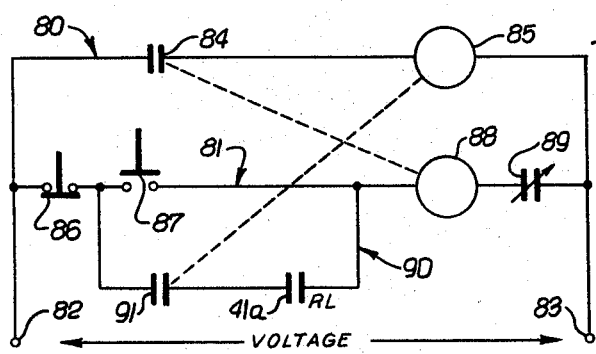
FIG. 8 is another circuit diagram illustrating the typical coupling of a control relay with a motor in controlling relation therewith.

FIG. 8 shows a conventional motor control into which relay 40 is incorporated. It includes parallel branches 80 and 81 connected across the power leads or terminals 82 and 83, branch 80 including motor coil contacts 84, and auxiliary relay coil 85. Branch 81 includes "stop" and "start" buttons 86 and 87, motor coil 88 and overload contacts 89. Shunt branch 90 includes auxiliary relay contacts 91 and contacts 40a associated with relay 40. "Start" button 87 is spring urged to open position, so that after the motor is started by momentary closing of the start button motor current is thereafter supplied through shunt branch 90. When the relay 40 drops out, contacts 41a open to de-energize the motor.

Purely illustrative component values for the FIG. 7 circuit diagram are as follows:

Resistors:
70 _____ 10 ohms.
93 _____ 200 ohms.
45 _____ 10 ohms.

Capacitors:
66 _____ 2,000 µf at 15 v., DC.
67 _____ 2,000 µf at 15 v., DC.
44 _____ 80 µf at 150 v., DC.

Transformers:
65 and 54 _____ 115 v. primary, 6.3 v. secondary.

Diodes:
59–62 _____ 1N 2071.
67, 42 _____ 1N 2071.
68 _____ 1N 1590.
41 _____ GE C15B.

Relay:
40 _____ KPR 11 AN.

Transistor:
50 _____ ET 6.

We claim:
1. In combination, an electric motor and loadable apparatus coupled to be driven by the motor so that the effective rate of advancement of the apparatus decreases under an abnormal condition, means to generate electrical pulses at a frequency proportional to the advancement rate of the apparatus, and circuit means connected to receive said pulses and to effect de-energization of the motor in response to a predetermined decrease in the frequency of pulse reception, said circuit means including a relay to control de-energization of the motor, a switch comprising an SCR connected in series with the relay coil and operable between conductive and non-conductive states at a frequency proportional to the frequency of pulse reception, an SCR control network having a pulse receiving input, and a delay network connected to delay motor de-energizing operation of the relay when said switch is in one of said states, said apparatus including a materials conveyor and an element subject to advancement in response to conveyor advancement, said conveyor and said motor having slip drive interconnection such that the rate of advancement of the conveyor may decrease under a sufficient conveyor overload condition, said pulse generating means including a sensor located to sense the advancement of said element and characterized in that the pulse generating means produces a pulse in response to said sensing.

2. The combination of claim 1 in which said delay network includes capacitance connected across the relay coil and resistance connected in series with the capacitance.

3. The combination of claim 1 in which the conveyor has buckets and one of said elements is on each of a number of said conveyor buckets.

4. The combination of claim 1 in which said conveyor has a screw on which said element is located.

5. The combination of claim 1 in which said pulse generating means includes electrical contacts characterized as relatively movable in response to advancement of said element.

6. The combination of claim 5 in which said element comprises a magnet.

7. The combination of claim 5 in which said pulse generating means includes a magnet sufficiently proximate said contacts that advancement of said element is adapted to alter the field of said magnet to effect said relative movement of the contacts.

8. The combination of claim 1 in which said pulse generating means includes a coil and said element comprises a material adapted to alter the magnetic field produced in response to electrical energization of said coil and also in response to said element advancement.

9. In combination, an electric motor and loadable apparatus coupled to be driven by the motor so that the effective rate of advancement of the apparatus decreases under an abnormal condition, means to generate electrical pulses at a frequency proportional to the advancement rate of the apparatus, and circuit means connected to receive said pulses and to effect de-energization of the motor in response to a predetermined decrease in the frequency of pulse reception, said switch comprising an SCR and said circuit means including an SCR control network having a pulse receiving input, said SCR control network including a transistor having emitter, base and collector electrodes one of which is connected to receive the input pulses, a transformer having primary and secondary coils, an AC to DC converter, said converter and said primary coil being connected in series and across the remaining two electrodes of the transistor, the transformer secondary coil being connected to control the state of the SCR.

10. The combination of claim 9 in which said SCR control network includes means to rectify and limit the voltage output of the transformer secondary coil for application to the SCR.

11. In sub-combination, a relay having a coil, an SCR connected in series with the relay coil, a control network having a pulse receiving input and an output connected to operate the SCR between conductive and non-conductive states at a frequency proportional to the frequency of pulse reception by said network input, and a delay network connected to delay operation of the relay when said SCR is in one of said states, said control network includes a transistor having emitter, base and collector electrodes one of which is connected to receive the input pulses, a transformer having primary and secondary coils, an AC to DC converter, said converter and said primary coil being connected in series and across the remaining two electrodes of the transistor, the transformer secondary coil being connected to control the state of the SCR.

References Cited
UNITED STATES PATENTS

| | | | |
|---|---|---|---|
| 2,451,816 | 10/1948 | Dunn | 318—461 |
| 2,467,582 | 4/1949 | Corkran | 318—463 X |
| 2,472,526 | 6/1949 | Frazee | 318—461 X |
| 2,796,572 | 6/1957 | Tallant | 318—461 X |

ORIS L. RADER, *Primary Examiner.*

B. A. COOPER, *Assistant Examiner.*